(12) United States Patent
Skovron et al.

(10) Patent No.: US 10,754,631 B2
(45) Date of Patent: Aug. 25, 2020

(54) TENANT UPGRADE ANALYTICS

(71) Applicant: Microsoft Technology Licensing, LLC, Redmond, WA (US)

(72) Inventors: John D. Skovron, Redmond, WA (US); James C. O'Brien, Redmond, WA (US); Ramasubramanian Shastri, Redmond, WA (US); Claudiu G. Diaconu, Redmond, WA (US); Shashidhar Rajashekara, Sammamish, WA (US); David W. Brodsky, Woodinville, WA (US); Sandipan Ganguly, Redmond, WA (US); Oana Silvia I. Nica, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/941,714

(22) Filed: Mar. 30, 2018

(65) Prior Publication Data
US 2018/0302303 A1    Oct. 18, 2018

Related U.S. Application Data

(60) Provisional application No. 62/485,754, filed on Apr. 14, 2017.

(51) Int. Cl.
*G06F 8/60* (2018.01)
*G06F 8/65* (2018.01)
(Continued)

(52) U.S. Cl.
CPC ............... *G06F 8/60* (2013.01); *G06F 8/65* (2013.01); *G06F 11/07* (2013.01);
(Continued)

(58) Field of Classification Search
CPC ....... H04L 41/082; H04L 43/065; G06F 8/65; G06F 11/0793; G06F 9/5055
(Continued)

(56) References Cited

U.S. PATENT DOCUMENTS

| 7,080,141 B1 | 7/2006 | Baekelmans et al. |
| 7,293,201 B2 | 11/2007 | Ansari |

(Continued)

FOREIGN PATENT DOCUMENTS

EP   2189900 A1   5/2010

OTHER PUBLICATIONS

Microsoft IT Showcase, "Insights in Windows Upgrade Analytics accelerate Windows 10 upgrades", Dec. 2016, pp. 1-6.*
(Continued)

*Primary Examiner* — Minh Chau Nguyen
(74) *Attorney, Agent, or Firm* — Michael Best & Friedrich LLP

(57) ABSTRACT

Methods and systems for determining an upgrade readiness metric of a tenant in a cloud environment. One method includes receiving, with an electronic processor, device telemetry data for a plurality of devices associated with a first plurality of tenants in the cloud environment and receiving, with the electronic processor, software telemetry data for a second plurality of tenants in the cloud environment. The method also includes determining, with the electronic processor, the upgrade readiness metric for the tenant based on the device telemetry data and the software telemetry data and displaying the upgrade readiness metric within a user interface.

17 Claims, 13 Drawing Sheets

(51) Int. Cl.
G06F 11/34 (2006.01)
G06F 11/07 (2006.01)
H04L 12/24 (2006.01)
H04L 12/26 (2006.01)
G06F 119/02 (2020.01)

(52) U.S. Cl.
CPC ...... *G06F 11/0709* (2013.01); *G06F 11/0793* (2013.01); *G06F 11/34* (2013.01); *G06F 11/3409* (2013.01); *H04L 41/082* (2013.01); *H04L 41/0866* (2013.01); *H04L 41/0893* (2013.01); *H04L 43/065* (2013.01); *G06F 2119/02* (2020.01); *G06F 2212/1032* (2013.01)

(58) Field of Classification Search
USPC ........................................................ 709/224
See application file for complete search history.

(56) References Cited

U.S. PATENT DOCUMENTS

| | | | |
|---|---|---|---|
| 7,562,358 | B2 | 7/2009 | Bennett et al. |
| 7,624,423 | B1 | 11/2009 | Eatough |
| 7,627,543 | B2 | 12/2009 | Lock et al. |
| 7,739,661 | B2 | 6/2010 | Garzia et al. |
| 7,865,889 | B1 | 1/2011 | Bird et al. |
| 7,996,814 | B1 | 8/2011 | Qureshi et al. |
| 8,135,775 | B1 | 3/2012 | Anderson et al. |
| 8,255,902 | B1 | 8/2012 | Satish |
| 8,671,099 | B2 | 3/2014 | Kapoor et al. |
| 8,694,983 | B1 | 4/2014 | Sobel et al. |
| 8,838,755 | B2 | 9/2014 | Sanghvi et al. |
| 8,949,674 | B2 | 2/2015 | Mancoridis et al. |
| 9,166,993 | B1 | 10/2015 | Liu |
| 9,262,366 | B2 | 2/2016 | Lenzmeier et al. |
| 9,274,874 | B1 | 3/2016 | Chamness et al. |
| 9,438,648 | B2 | 9/2016 | Asenjo et al. |
| 9,547,564 | B1 | 1/2017 | Troutman et al. |
| 9,626,277 | B2 | 4/2017 | Thangamani et al. |
| 2004/0123188 | A1 | 6/2004 | Srinivasan et al. |
| 2007/0055914 | A1 | 3/2007 | Chandwani et al. |
| 2010/0014432 | A1 | 1/2010 | Durfee et al. |
| 2013/0159326 | A1* | 6/2013 | Kyomasu ............... G06F 8/61 707/754 |
| 2014/0310222 | A1 | 10/2014 | Davlos et al. |
| 2015/0133076 | A1 | 5/2015 | Brough |
| 2015/0163121 | A1 | 6/2015 | Mahaffey et al. |
| 2015/0242262 | A1 | 8/2015 | Ranganathan et al. |
| 2015/0302303 | A1* | 10/2015 | Hakim ............... G06Q 10/063 706/11 |
| 2015/0309826 | A1 | 10/2015 | Kirubanandam et al. |
| 2015/0341240 | A1 | 11/2015 | Iyoob et al. |
| 2016/0292065 | A1 | 10/2016 | Thangamani et al. |
| 2016/0350098 | A1 | 12/2016 | Kuchibhotla et al. |
| 2016/0352768 | A1 | 12/2016 | Lefebvre et al. |
| 2016/0371163 | A1 | 12/2016 | Swierk et al. |
| 2016/0371170 | A1 | 12/2016 | Salunke et al. |
| 2018/0129492 | A1* | 5/2018 | Singh ....................... G06F 8/65 |
| 2019/0018729 | A1 | 1/2019 | Shepard et al. |

OTHER PUBLICATIONS

"ManageEngine Mobile Device Manager Plus—Zoho MDM", Retrieved From <<https://web.archive.org/web/20160609150600/https:/www.zoho.com/mdm-cloud.html>>, Jun. 9, 2016, 6 Pages.
"Mobile Device Management Software—ManageEngine Mobile Device Manager Plus", Retrieved From <<https://www.manageengine.com/mobile-device-management/>>, Retrieved on: Jan. 30, 2018, 12 Pages.
"Overview of Office Telemetry", Retrieved From <<https://technet.microsoft.com/en-in/library/jj863580.aspx>>, Dec. 16, 2016, 12 Pages.
Briggs, et al., "Integrate Upgrade Readiness with System Center Configuration Manager", Retrieved From <<https://docs.microsoft.com/en-us/sccm/core/clients/manage/upgrade/upgrade-analytics>>, Jul. 31, 2017, 6 Pages.
Brower, et al., "Get started with Upgrade Readiness", Retrieved From <<https://docs.microsoft.com/en-us/windows/deployment/upgrade/upgrade-readiness-get-started>>, Sep. 20, 2017, 10 Pages.
Brower, et al., "Monitor the health of devices with Device Health", Retrieved From <<https://docs.microsoft.com/en-us/windows/deployment/update/device-health-monitor>>, Nov. 14, 2017, 5 Pages.
Brower, et al., "Use Upgrade Readiness to manage Windows upgrades", Retrieved From <<https://docs.microsoft.com/en-us/windows/deployment/upgrade/use-upgrade-readiness-to-manage-windows-upgrades>>, Aug. 30, 2017, 5 Pages.
Brower, et al., "Using Device Health", Retrieved From <<https://docs.microsoft.com/en-us/windows/deployment/update/device-health-using>>, Oct. 10, 2017, 15 Pages.
Brown, et al., "Use the Readiness Toolkit to assess application compatibility for Office 365 ProPlus", Retrieved From <<https://docs.microsoft.com/en-us/deployoffice/use-the-readiness-toolkit-to-assess-application-compatibility-for-office-365-pro>>, Jan. 2, 2018, 26 Pages.
Paneerselvam, Muthurani Lavanya, "How to determine UC Hardware readiness for upgrade?", Retrieved From <<https://supportforums.cisco.com/t5/collaboration-voice-and-video/how-to-determine-uc-hardware-readiness-for-upgrade/ta-p/3150432>>, Oct. 22, 2013, 17 Pages.
"Insights in Windows Upgrade Analytics accelerate Windows 10 upgrades", Retrieved from https://www.microsoft.com/itshowcase/Article/Content/962/Insights-in-Upgrade-Readiness-accelerate-Windows-10-upgrades, Dec. 20, 2016, 10 Pages.
"International Search Report and Written Opinion Issued in PCT Application No. PCT/US2018/027459", dated Oct. 4, 2018, 6 Pages.
"Health and Performance Monitoring", Retrieved from: http://www.cisco.com/c/en/us/td/docs/security/security_management/cisco_security_manager/security_manager/4-4/user/guide/CSMUserGuide_wrapper/HPMchap.pdf, Retrieved Date: May 15, 2017, 40 Pages.
"Working with Deployment Groups in AWS CodeDeploy", Retrieved from: http://web.archive.org/web/20170601233459/http://docs.aws.amazon.com/codedeploy/latest/userguide/deployment-groups.html, Retrieved Date: May 18, 2017, 1 Pages.
Halfin, et al., "Build deployment rings for Windows 10 updates", Retrieved From https://docs.microsoft.com/en-us/windows/deployment/update/waas-deployment-rings-windows-10-updates, Apr. 24, 2017, 3 Pages.
Hangal, et al., "Tracking Down Software Bugs Using Automatic Anomaly Detection", In Proceedings of the 24th International Conference on Software Engineering, May 19, 2002, pp. 291-301.
Jalote, et al., "Measuring Reliability of Software Products", In TechReport of MSR-TR-2004-145, Nov. 1, 2004, pp. 1-8.
"Non-Final Office Action Issued in U.S. Appl. No. 15/915,556", dated Oct. 16, 2019, 16 Pages.
"Non-Final Office Action Issued in U.S. Appl. No. 15/915,539", dated Dec. 17, 2019, 8 Pages.
"Final Office Action Issued in U.S. Appl. No. 15/915,556", dated Feb. 10, 2020, 17 Pages.
"Non-Final Office Action Issued in U.S. Appl. No. 15/915,556", dated Jun. 10, 2020, 17 Pages.

* cited by examiner

FIG. 4

- Home

MANAGE
- Assets
- Deployment Plans
- Security
- Health

CONFIGURE
- Pilot
- Device Profiles
- Readiness Rules
- Connected Services

Last updated 9/15/2017 at 01:00 AM

Feed
ALL. ALERTS. RELEASES. INSIGHTS. ACTIVITY.

*New Release* ✕
Windows 10 1709, Feature Update is now available
3 weeks ago

*New Release* ✕
Office 365 ProPlus 1709 is now available
7 weeks ago

More coming soon!

— 402

— 400

My Deployment Plans (0)
NAME   DEVICES   COMPLETION TARGET DATE   % COMPLETED
You don't have any active deployment plans

404

My Devices
⬢ 15 K

My Apps
⬢ 23 K

My Environment
Windows          Office
▓ 7 SP1         ▓ 2010 PROFESSIONAL
  80%             80%
▓ 8.1           ▓ 2016 PRO PLUS
  15%             15%
▓ 10 V. 1703    ▓ 2013 PRO PLUS
  5%              5%

My Apps
Applications  10
Add-in        135
Macros        24

My Office Assets
⬢ 238

406

Security Compliance
Windows          Office
▓ Not Compliant ▓ Not Compliant
  10%             10%
▓ Compliant     ▓ Compliant
  90%             90%

Feature Currency
Windows          Office
▓ Supported     ▓ Supported
  80%             80%
▓ Near EOS      ▓ Near EOS
  15%             15%
▓ EOS           ▓ EOS
  5%              5%

COMING SOON

408

400

| | | Devices | Apps | Office Apps | Office Add-Ins | Office Macros | Computer Groups | | |
|---|---|---|---|---|---|---|---|---|---|
| ⊕ | Home | | | | | | | Previous Page 1 2 3 ... 7 Next Page | |
| | | Edit | 15,000 Results | | | | | | |
| MANAGE | | ☐ Name | MANUFACTURER | MODEL FAMILY | OS VERSION | GROUP | IN A PLAN | PILOT DEVICE | |
| ⊕ | Assets | ☐ Device_Name_01 | Dell | MODEL_0123 | Windows 7 | HR | Yes | Always Include | |
| ⊕ | Deployment Plans | ☐ Device_Name_01 | Dell | MODEL_0123 | 1703 | Finance | No | Eligible | |
| ⊕ | Security | ☐ Device_Name_01 | Dell | MODEL_0123 | 1607 | Dev | No | Never Include | |
| | | ☐ Device_Name_01 | Dell | MODEL_0123 | | IT | Yes | Always Include | |
| ⊕ | Health | ☐ Device_Name_01 | Dell | MODEL_0123 | | IT | Yes | Always Include | |
| | | ☐ Device_Name_01 | Dell | MODEL_0123 | | HR | Never include | Eligible | |
| CONFIGURE | | ☐ Device_Name_01 | Dell | MODEL_0123 | | Sales | Yes | Eligible | |
| | | ☐ Device_Name_01 | Dell | MODEL_0123 | | Sales | Yes | Always Include | |
| ⊕ | Pilot | ☐ Device_Name_01 | Dell | MODEL_0123 | | IT | Yes | Eligible | |
| ⊕ | Device Profiles | ☐ Device_Name_01 | Dell | MODEL_0123 | | IT | Yes | Always Include | |
| | | ☐ Device_Name_01 | Dell | MODEL_0123 | | HR | No | Always Include | |
| ⊕ | Readiness Rules | ☐ Device_Name_01 | Dell | MODEL_0123 | | Finance | Yes | Eligible | |
| ⊕ | Connected Services | ☐ Device_Name_01 | Dell | MODEL_0123 | | Dev | Yes | Eligible | |
| | | ☐ Device_Name_01 | Dell | MODEL_0123 | | IT | No | Always Include | |
| | | ☐ Device_Name_01 | Dell | MODEL_0123 | | IT | Yes | Eligible | |
| | | ☐ Device_Name_01 | Dell | MODEL_0123 | | HR | Yes | Never Include | |

FIG. 5

| Home | Devices | Apps | Office Apps | Office Add-Ins | Office Macros | Computer Groups | | |
|---|---|---|---|---|---|---|---|---|
| MANAGE | | | | | | | Previous Page 1 2 3 ... 7 Next Page | |
| ⬡ Assets | Edit | | | | | | | |
| ⬡ Deployment Plans | ☐ NAME | VENDOR | VERSION | TOTAL INSTALLS | IMPORTANCE | SUPPORT STATEMENT | TEST PLAN | OWNER |
| ⬡ Security | App. Na... | Microsoft | 1.22.333 | 1000 (10%) | Business Criti... | | | |
| ⬡ Health | App. Na... | Microsoft | 1.22.333 | 1000 (10%) | Need to Set | | | |
| | App. Na... | Microsoft | 1.22.333 | 1000 (10%) | Need to Set | | | |
| CONFIGURE | | | | | | | | |
| ⬡ Pilot | | | | | | | | |
| ⬡ Device Profiles | | | | | | | | |
| ⬡ Readiness Rules | | | | | | | | |
| ⬡ Connected Services | | | | | | | | |

TENANT UPGRADE ANALYTICS

RELATED APPLICATIONS

This application claims priority to U.S. Provisional Patent Application No. 62/485,754, filed Apr. 14, 2017, the entire content of which is hereby incorporated by reference.

FIELD

Embodiments described herein relate to methods and systems for managing devices associated with an organization by leveraging cloud-side telemetry data including, for example, device statuses and software states.

SUMMARY

Current device management tools require significant manual work by information technology (IT) professionals to gather device data and figure out the status of various software configurations of multiple devices to assess software deployment risk and mitigation steps. For example, this manual process typically takes months to complete and is subject to human error, incomplete data, and other downsides. For example, if device data is not available for one or more devices associated with an organization, this lack of information impacts the IT professional's ability to provide accurate information regarding the risks associated with deploying new or updated software. Furthermore, the collection of such device data is typically collected by the devices (through execution of a software agent) and transmitted to one or more external servers or devices. Accordingly, it is difficult to modify the data collected by the devices and the collection of data relies heavily on the operation and proper configuration of such agents.

Due to this difficult, IT professionals struggle to keep up with changes across an organization and may be hesitant to perform upgrades, including switching to new platforms, such as a cloud services. For example, IT professionals often are concerned about application and driver compatibility and on-going validation, performing a comprehensive inventory and device management (across operating systems and software applications), and network bandwidth consumed by frequent updates.

Accordingly, embodiments described herein provide organizations (IT professionals) with an intelligence-driven cloud-solution that builds trust and confidence of adopting a new model (a cloud service) by reducing the guesswork in performing an upgrade and validation while enabling an organization to get their software current and stay current. In particular, as described in more detail below, the embodiments described herein enable users (IT professionals) to accomplish deployment tasks by providing a plan to identify issues and remediation steps and guidance on how to reach goals along with post-deployment monitoring of a deployment plan and overall health of an organization's environment.

For example, embodiments described herein leverage device data gather by cloud-side telemetry data that includes, for example, both device status and software states. By using data collected by a cloud service regarding users, device management tools can provide IT professionals with a more complete view of the devices associated with a particular organization and more accurate information regarding upgrade readiness of particular devices or a particular tenant of the cloud service.

For example, one embodiment provides a method for determining an upgrade readiness metric of a tenant in a cloud environment. The method includes receiving, with an electronic processor, device telemetry data for a plurality of devices associated with a first plurality of tenants in the cloud environment and receiving, with the electronic processor, software telemetry data for a second plurality of tenants in the cloud environment. The method also includes determining, with the electronic processor, the upgrade readiness metric for the tenant based on the device telemetry data and the software telemetry data and displaying the upgrade readiness metric within a user interface.

BRIEF DESCRIPTION OF THE DRAWINGS

FIGS. 4-6 illustrate a user interface generated by a software deployment tool provided via the analytics system of FIG. 1 providing an inventory of devices and assets associated with a user according to some embodiments.

FIGS. 7-11 illustrate a user interface generated by the software deployment tool provided via the analytics system of FIG. 1 allowing a user to create a software deployment plan according to some embodiments.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
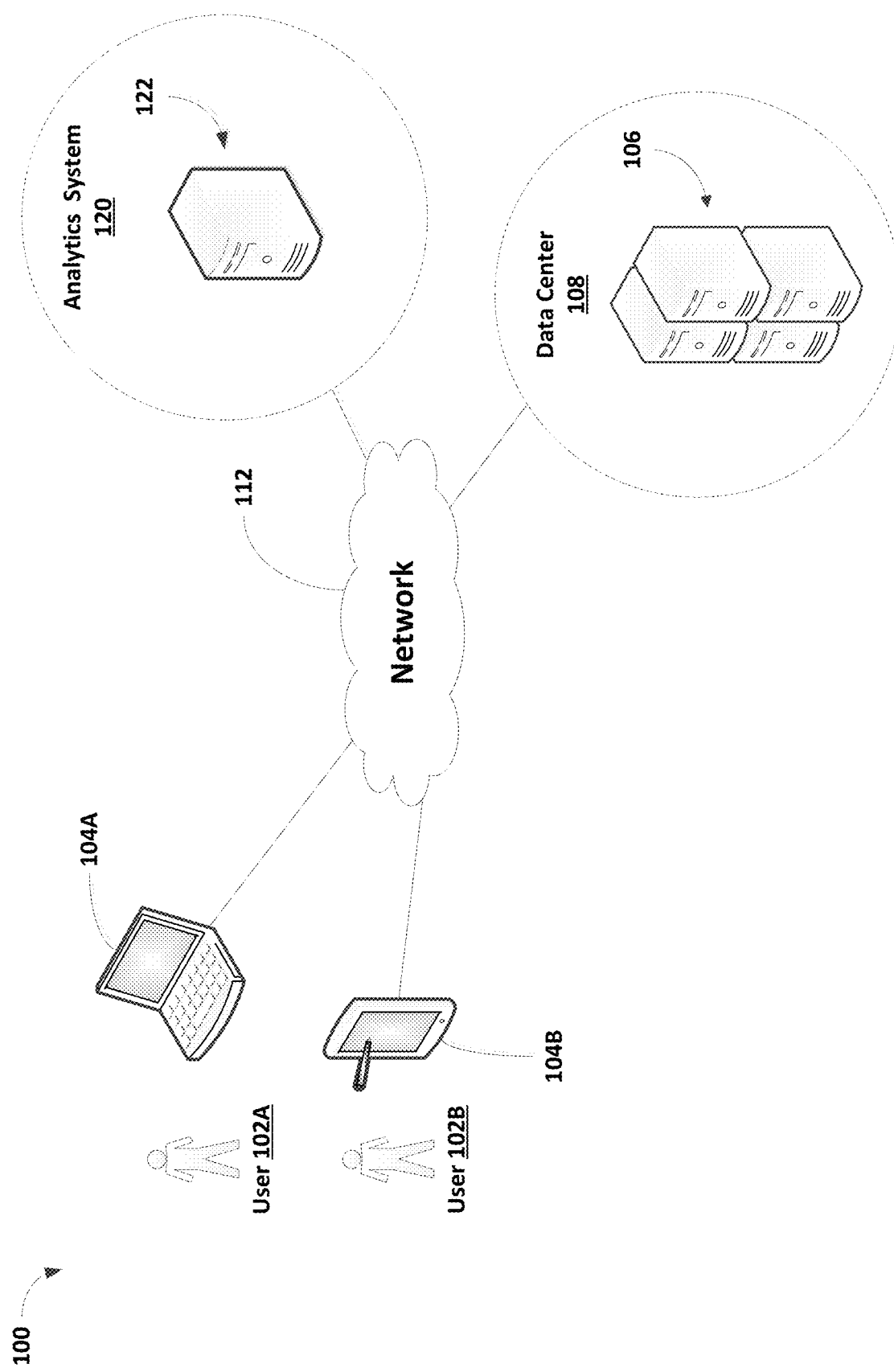
FIG. 1 schematically illustrates an environment for implementing an analytics system for a cloud service according to some embodiments.

FIG. 1 illustrates an example environment 100 for implementing an analytics system for a cloud service using telemetry data. In the environment 100, a first user 102A and a second user 102B (collectively "users 102") represent a plurality of users 102 that use respective client computing devices 104A and 104B (collectively "client computing devices 104") to access one or more servers 106 of a data center 108 that provides one or more online services. The online services can include, without limitation, a personal information management (PIM) service, such as an email service, a web-hosting service, a storage service, a virtual machine service, a business productivity service, an entertainment service (for example, a music service, a video service, a gaming service, and the like), a personal productivity service (for example, a travel service), a social networking service, or any similar cloud-based service. It should be understood that the environment 100 may include additional components than those illustrated in FIG. 1 in various configurations. For example, although only two client computing devices 104 are illustrated in FIG. 1 as one example, many more users may interact (via client computing devices) with the online services provided via the data center 108. Furthermore, the data center 108 may include any number of servers organized in various configurations. Also, in some embodiments, a client computing device 104 may communicate with a server 106 included in the data center 108 over the network 112 via one or more intermediary devices, including, for example, firewalls, gateways, routers, and the like.

The terms "users," "consumers," "customers," or "subscribers" are used interchangeably herein to refer to the users 102, and one or more users 102 can subscribe to, or otherwise register for, access to one or more of the online services as a "tenant" of the online services. In this regard, a tenant can comprise an individual user 102 or a group of multiple users 102, such as when an enterprise with hundreds of employees registers as a tenant of the online services. Accordingly, the data center 108 can use a database or a similar data structure to manage registered tenants of the online services, including management of access credentials for individual users 102. Each tenant is also associated with one or more devices, such as one or more client computing devices 104, and assets, such as software applications, (custom) add-ins, (custom) macros, and the like, that are owned or operated on behalf of the tenant.

The client computing devices 104 (sometimes referred to herein as "client devices 104") can be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (for example, a smart watch, electronic "smart" glasses, a fitness tracker, or the like), or any other electronic device that can transmit and receive data over one or more networks. The network 112 illustrated in FIG. 1 can include wired networks, wireless networks, or a combination thereof that enable communications between the various entities in the environment 100. In some configurations, the network 112 includes cable networks, the Internet, local area networks (LANs), wide area networks (WAN), mobile telephone networks (MTNs), and other types of networks, possibly used in conjunction with one another, to facilitate communication between the servers 106 and the client devices 104.

The servers 106 associated with the data center 108 can be organized into one or more geographically-distributed server clusters, where a server cluster can comprise a subgrouping of the servers 106. In this manner, a vast number of users 102 can access the online services from geographically disparate locations over the world.

Figure 2:
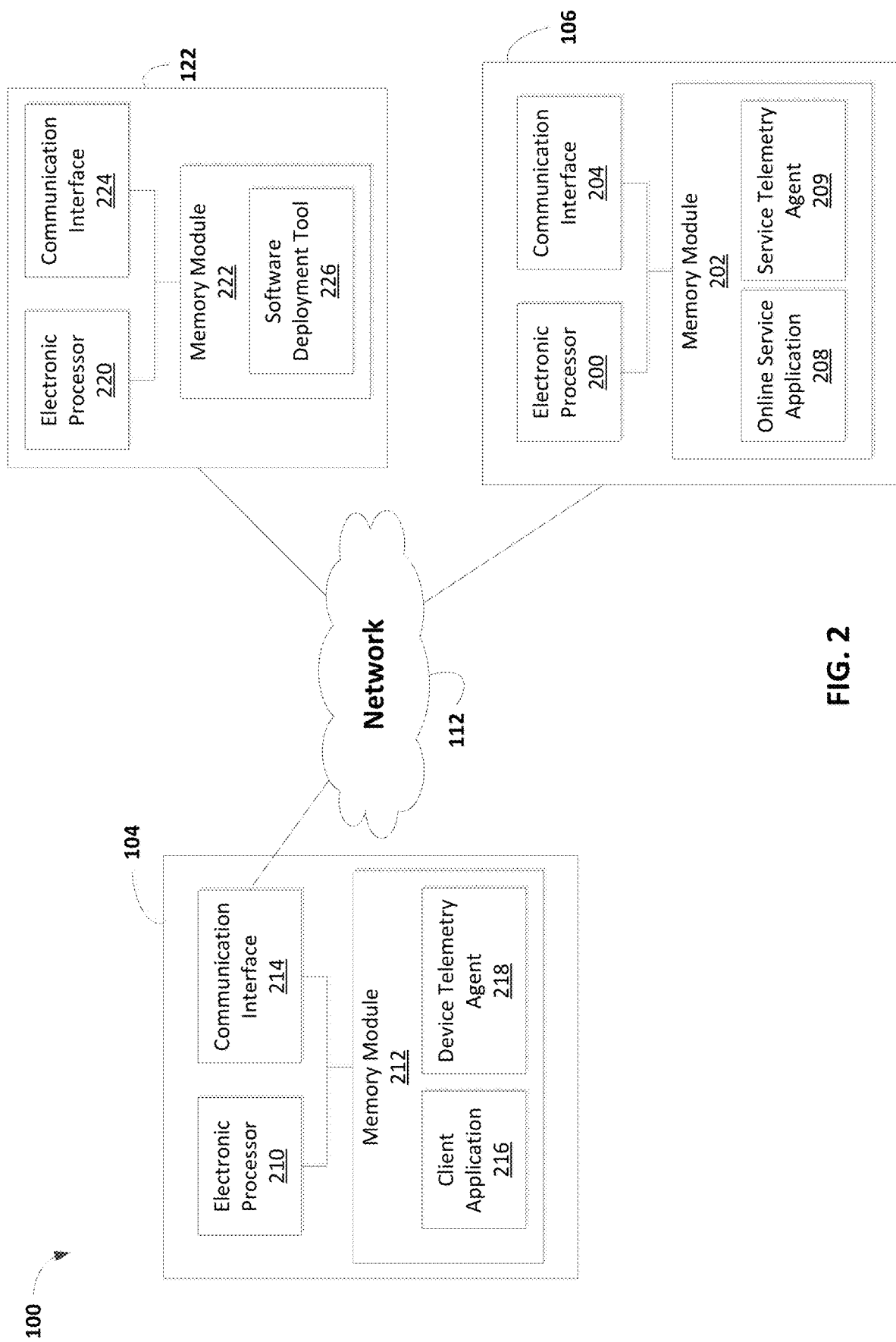
FIG. 2 schematically illustrates a server included in the analytics system of FIG. 1 according to some embodiments.

As illustrated in FIG. 2, a server 106 included in the data center 108 can include an electronic processor 200, a computer-readable memory module 202, and a communication interface 204. The memory module 202 can include non-transitory memory, such as random access memory, read-only memory, or a combination thereof. The electronic processor 200 can include a microprocessor configured to execute instructions stored in the memory module 202. The memory module 202 can also store data used with and generated by execution of the instructions. The communication interface 204 allows the server 106 to communicate with external networks and devices, including the network 112. For example, the communication interface 204 may include a wireless transceiver for communicating with the network 112. It should be understood that a server 106 included in the data center 108 may include additional components than those listed in FIG. 2 in various configurations. For example, in some embodiments, a server 106 included in the data center 108 includes a plurality of electronic processors, memory modules, communication interfaces, or a combination thereof.

As also illustrated in FIG. 2, the memory module 202 may store an online service application 208. The online service application 208 (as executed by the electronic processor 200) provides online services to a user communicating with the server 106 via a client device 104. In some embodiments, the online service application 208 includes a word processing application, a calendar application, a presentation application, an email application, or the like. It should be understood that each server 106 included in the data center 108 may store and execute one or more different online service applications 208 to provide a plurality of online services to users.

In some embodiments, the memory module 202 also stores a service telemetry agent 209. The service telemetry agent 209 (as executed by the electronic processor 200) collects service telemetry data regarding the online services provided via the data center 108. In general, the service telemetry data includes data generated as a result of the client application 216 accessing (connecting to, or disconnecting from) the online service 110 provided via the data center 108 and as a result of the user 102 using the online services via the client application 216. For example, the service telemetry data may include an Internet Protocol (IP) address from where a client device 104 is connecting to the data center 108, logs of successful connections, online service usage, duration of use, and type of use, logs of failed requests, logs of errors and error codes, network type information (for example, wired network connection, wireless network connection, connected to a proxy, or the like), a server identifier of the last known server 106 to which the client device 104 was connected, a server identifier of the server 106 to which the client device 104 is currently connected, logs of user input commands received via a user interface of the client application 216, service connectivity data (for example, login events, auto discover events, and the like), user feedback data (for example, feedback about features of the online services), a client configuration, logs of time periods for responding to a user input event (time periods indicating hangs or crashes), logs of time periods for the following statuses: connected, disconnected, no network, needs password, get credentials, showing password prompt, showing certificate error, showing user interface, working offline, transient failures, version blocked presentation mode, trying to connect, failure lockout, or waiting, and the like. The service telemetry agent 209 may collect the telemetry data for various purposes, including, for example, billing, security, auditing, feedback purposes, performance tracking, and the like. For example, as described in more detail below, the service telemetry data may be used to determine software deployment recommendations for a particular tenant of the online services. In some embodiments, the service telemetry agent 209 collects the service telemetry data without the need for an agent on a client device 104.

The service telemetry agent 209 can locally store the collected service telemetry data and/or can transmit the data to another data storage location external to the server 106 and event external to the data center 108. Regardless of where the service telemetry data is stored, the data is accessible by an analytics system 120. As illustrated in FIG. 1, the analytics system 120 includes one or more servers 122 and communicates with the network 12. In some embodiments, the servers 122 are included in the data center 108 and may provide access to an online service as described above with respect to the servers 106. However, in other embodiments, as illustrated in FIG. 1, the servers 122 may be separate from the data center 108 but may be configured to communicate with the data center 108 (individual servers 106 included in the data center 108). As also described in more detail below, the analytics system 120 is configured to process telemetry data and provide software deployment recommendations based on the telemetry data.

Accordingly, in some embodiments, the service telemetry agent 209 is configured to collect service telemetry data and transmit the service telemetry data to the analytics system 120. The service telemetry agent 209 may be configured to transmit collected telemetry data to the server 122 periodically and/or in response to events or rules. For example, the service telemetry agent 209 may be configured to transmit collected data to the servers 122 at a predetermined frequency (for example, every 5, 10, or 15 minutes or at any suitable time interval). As another example, the service telemetry agent 209 may apply one or more rules to determine when collected data should be transmitted to the server 122, such as in response to an event. An event may include an error event (a connection failure) or a success event (a successful connection). Alternatively or in addition, the servers 122 may be configured to request the collected service telemetry data from the service telemetry agent 209 (or another data source) on a predetermined frequency, in response to a detected event (including receipt of user input requesting a software development recommendation), or the like. For example, as the collected service telemetry data may have multiple uses separate from determining software deployment recommendations, the service telemetry agent 209 may be configured to store collected data to one or more data repositories and the analytics system 120 may be configured access these repositories and retrieved needed data to perform a software deployment recommendation as applicable.

As illustrated in FIG. 2, a client device 104 may include an electronic processor 210, a computer-readable memory module 212, and a communication interface 214 similar to the electronic processor 200, the memory module 202, and the communication interface 204 as described above with respect to the server 106. However, as illustrated in FIG. 2, the memory module 212 included in the client device 104 may store a client application 216. The client application 216, as executed by the electronic processor 210, allows a user 102 to access online services provided by the servers 106 (via an online service application 208) over the network 112. In some configurations, the client application 216 includes a dedicated application for communicating with the data center 108, such as a word processing application, a calendar application, a presentation application, an email client application, or the like that is configured to access an online service. Alternatively, the client application 216 may include a web browser that allows the client device 104 to access the online services provided via the data center 108 in response to a user 102 entering a uniform resource locator (URL) in an address bar of the web browser.

In some embodiments, the client device 104 also includes a device telemetry agent 218. Similar to the service telemetry agent 209, the device telemetry agent 218 (as executed by the electronic processor 200 included in a client device 104) is configured to collect device telemetry data and transmit the device telemetry data to the analytics system 120. In some embodiments, the device telemetry data transmitted by the device telemetry agent 218 includes information about a client device 104, such as, for example, configuration information including hardware attributes such as attributes about the electronic processor 210, memory module 212, the communication interface 214, or other hardware components of the client device 104 as well as performance-related information such as uptime and sleep details and the number of crashes or hangs. In some embodiments, the device telemetry data also includes information about software installed on the client device 104 including, for example, an operating system and other software applications, drivers, plug-ins, and the like (collectively referred to herein as "software" or "applications") and associated configurations. The device telemetry data may also include identifying information regarding the client device 104, including, for example, a tenant identifier, a user identifier, a machine access control (MAC) address, the build, make, and model of the client device 104, or a combination thereof.

As illustrated in FIG. 2, each server 122 included in the analytics system 120 can include an electronic processor 220, a computer-readable memory module 222, and a communication interface 224 similar to the electronic processor 200, the memory module 202, and the communication interface 204 as described above with respect to the server 106. However, as illustrated in FIG. 2, the memory module 222 included in the server 122 may store a software deployment tool 226. The software deployment tool 226, as executed by the electronic processor 220, processes telemetry data collected by one or more service telemetry agents 209 and one or more device telemetry agents 218 to generate a software deployment recommendation for a particular tenant. Accordingly, the software deployment tool 226 can use existing service telemetry data collected with regard to the online services with the device telemetry data to generate a more accurate and useful deployment recommendation than when just device telemetry is used.

For example, using the service telemetry data provides further insight into the uses, patterns, and needs of a tenant, which allows the software deployment tool 226 to generate a better recommendation as compared to using only device telemetry data. Furthermore, as multiple tenants typically use online services, telemetry data (device, service, or both) associated with other tenants may be used to generate a recommendation. As one example, model exist that provide a metric, such as a readiness metric, for devices or groups of devices indicating how ready the devices are for an update (for example, a probability of a successful update). These models can take into account various telemetry data of the devices. However, if telemetry data is not available for a particular device, this lack of information may impact the readiness metric (or other upgrade recommendations). Accordingly, in these situations, the software deployment tool 226 may take into consideration telemetry (device, service, or both) of similar devices associated with other tenants using the online services. The software deployment tool 226 may apply one or more rules for determine when and how to use telemetry data associated with other tenants. For example, the rules may specify that if complete device telemetry data is available for a particular tenant, telemetry data for other tenants may not be considered. Other rules may specify how "similar" a device of another tenant needs to be before the telemetry data associated with the device is used. Also, in addition or as an alternative to filling gaps in information about a particular tenant to determine a readiness metric or other type of recommendation, the results of deployments for similar-situated tenants can be used to generate models for generating a readiness metric or other recommendations. For example, machine learning and other modeling techniques can be applied to deployments performed for tenants of the online services (using applicable telemetry data) to develop accurate models than be applied to telemetry data for other tenants to generate deployment recommendations (readiness metrics, schedules, scopes, timing, and the like).

Figure 3:
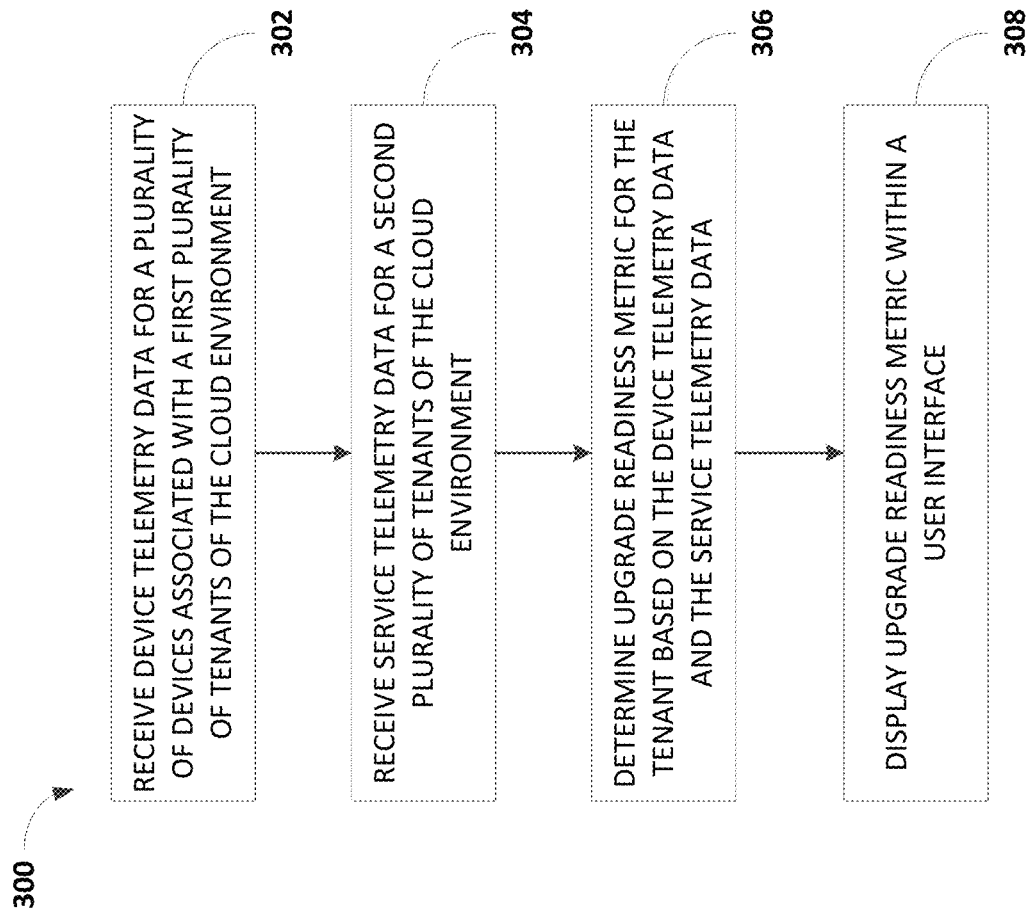
FIG. 3 is a flowchart illustrating a method of generating a readiness metric for a tenant performed by the analytics system of FIG. 1 according to some embodiments.

For example, FIG. 3 illustrates a method 300 for determining an upgrade readiness metric of a tenant in a cloud environment. The method 300 is described herein as being performed by the software deployment tool 226 (as executed by an electronic processor 220 included in a server 122 within the analytics system 120). However, it should be understood that the functionality described herein with respect to the method 300 may be combined and distributed in various configurations. For example, in some embodiments, a server 106 included in the data center 108 performs one or more portions of the method 300.

As illustrated in FIG. 3, the method 300 includes receiving, with the software deployment tool 226, device telemetry data for a plurality of devices associated with a first plurality of tenants in the cloud environment provided by the data center 108 (at block 302). As described above, a device telemetry agent 218 executed by a client computing device 104 may be configured to transmit device telemetry data for storage within the data center 108, the analytics system 120, or a combination thereof. In some embodiments, the first plurality of tenants includes the tenant seeking an upgrade readiness metric. However, as noted above, in some embodiments, device telemetry data for other tenants (such as other tenants with similar devices) may be used to provide deployment recommendations to a particular tenant. In particular, the software deployment tool 226 may access device telemetry data for at least one device associated with a tenant different from the tenant seeking a readiness metric that has an attribute similar to an attribute of a device associated with the tenant (for example, make, model, configuration, or the like).

The method 300 also includes receiving software telemetry data for a second plurality of tenants in the cloud environment provided by the data center 108 (at block 304). As described above, a service telemetry agent 209 executed by the data center 108 may be configured to collect service telemetry data when users access and use the online services provided via the data center 108. As also described above, service telemetry data may include data regarding tenants usage of online service provided via the data center 108. In some embodiments, the first plurality of tenants (associated with the device telemetry data) and the second plurality of tenants (associated with the service telemetry data) are the same. However, in other embodiments, the tenants included in each plurality of may differ depending on what tenants have provided device telemetry data, what tenants have recently or frequently used the online services, or the like. Also, in some embodiments, the second plurality of tenants includes the tenant seeking a readiness metric. However, as noted above, service telemetry for other tenants of the online environment (such as tenants have similar attributes) may also be used to generate a deployment recommendation for a tenant.

The method 300 also includes determining the upgrade readiness metric for the tenant based on the device telemetry data and the software telemetry data (at block 306) and displaying the upgrade readiness metric within a user interface (at block 308). In some embodiments, the upgrade readiness metric is displayed within a dashboard updated in real-time. For example, FIG. 4 illustrates a user interface 400 generated by the software deployment tool 226 that displays various software deployment information associated with a tenant. In some embodiments, the user interface 400 is provided through a dedicated portal. As described in more detail below, the user interface 400 may allow a user (an IT professional) to view notifications of new releases (offered, required, or recommended upgrades), review devices and assets, and scope and define a software deployment plan. A software deployment plan may include a set of recommended steps to accomplish a task by using available information from the tenant's devices, assets, other telemetry data, target deadlines, and the like. These steps may be reviewed, validated, remediated, and optimized as part of the deployment plan. In some embodiments, the user interface also allows a user to monitor the execution of a deployment plan and, optionally, perform ongoing monitoring of a tenant's device, assets, or a combination thereof to track a tenant's overall health and trigger alerts accordingly.

As illustrated in FIG. 4, the user interface 400 may include a feed section 402 that provides notifications of new releases, a deployment plan section 404 that provides information regarding one or more (active) deployment plans, a devices and assets section 406 that provides information regarding a tenant's devices and assets, and a metrics section 408 that provides one or more metrics regarding a tenant, such as environment configurations, security compliance, and feature currency. The information provided via the metrics section 408 can be provided in various textual and graphical forms. For example, metrics can be provided as pie charts, bar charts, or other types of graphical or textual data.

Selecting a notification from the feed section 402 may display additional information regarding the release including a description, a release date, a package size, and the like. In some embodiments, one or more metrics may also be provided for a release, such as a percentage of users that have applied the upgrade, including a percentage of tenants of the online services that have applied the upgrade.

Selecting information (tiles) included in the devices and assets section 406 may display additional information regarding a tenant's devices, assets, or both. For example, as illustrated in FIG. 5, the user interface 400 may display an inventory of devices, applications, add-ins, macros, computer or device groups, and the like for the tenant. The information provided in these inventors can be collected from the device telemetry data, service telemetry data, or both collected as described above. As illustrated in FIG. 6, one or more columns in a displayed inventory may be editable through the user interface 400. For example, a user may be able to set a group for a device, an importance for an application or add-in, or deployment rules for a device (whether a device can be included in a deployment, whether a device can be a pilot device, or the like). These user inputs may be used by the software deployment tool 226 to customize a deployment plan for a particular tenant, such as by excluding critical applications from initial pilots to prevent interfering with these application until any issues have been identified and remedied. Similarly, a user may prefer some devices or groups of devices be included or excluded from pilots (or an entire deployment plan). Similarly, a user may be able to assign devices to groups to limit deployments to particular subset of a tenant's devices.

In some embodiments, the user interface 400 also provides one or more reports indicating the status of devices, assets, or both being processed to be added to a tenant's inventory, such as percentage of devices or assets that have been processed and added to the inventory and a percentage remaining. Any errors in processing devices or assets included in a tenant's inventory may also be provided in such reports.

Figure 7:
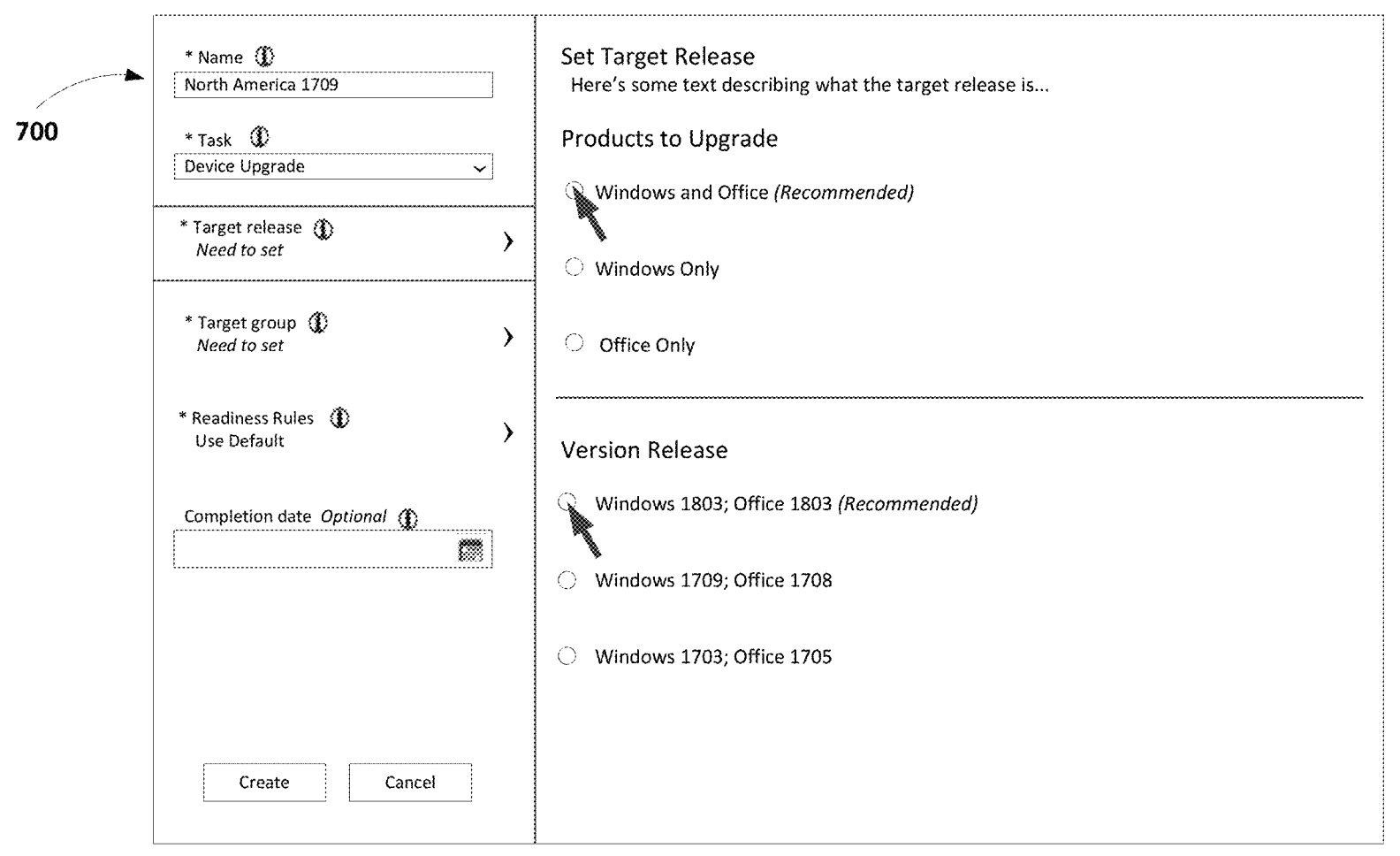
Figure 8:
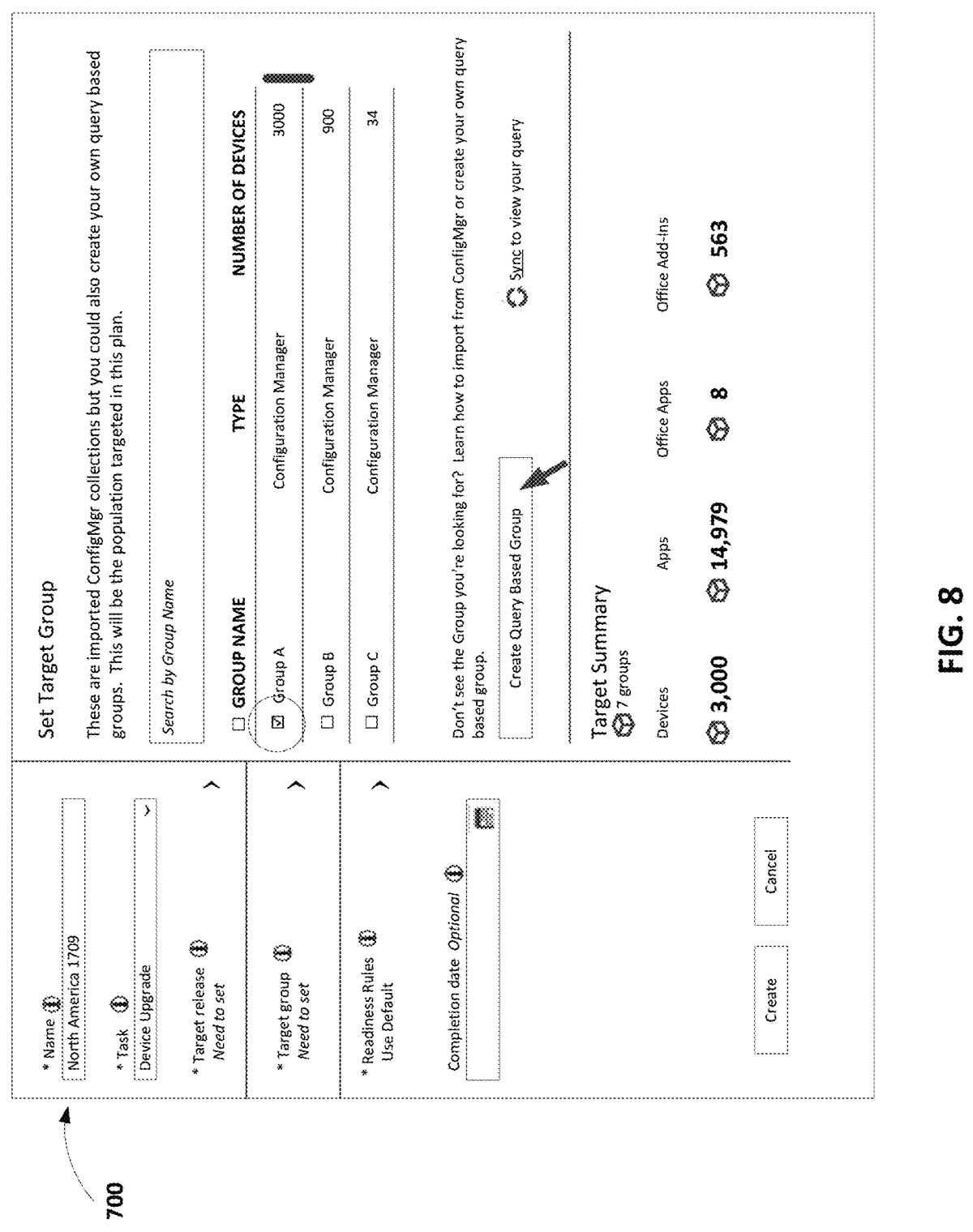
Figure 11:
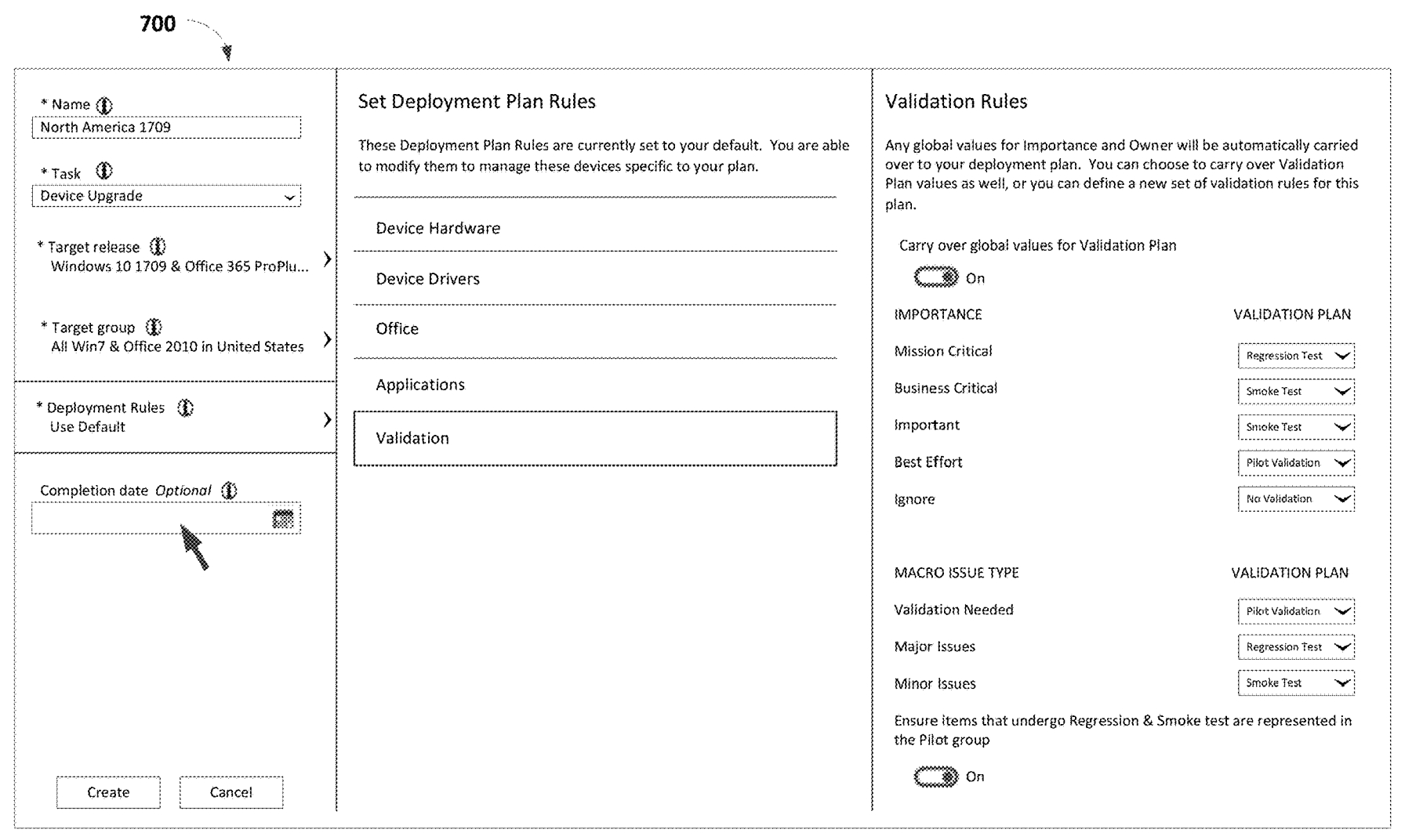
Figure 12:
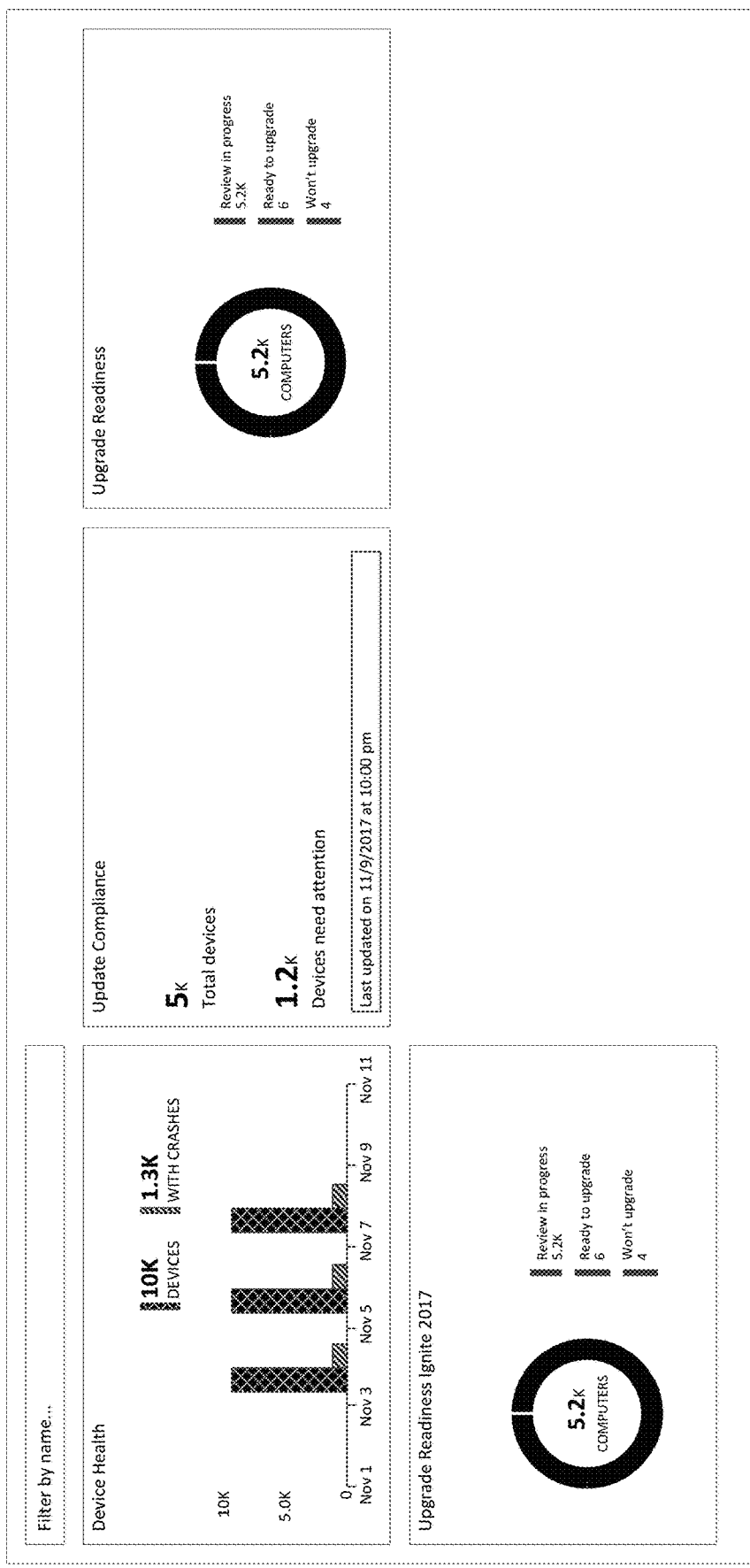
FIG. 12 illustrates a user interface generated by the software deployment tool provided via the analytics system of FIG. 1 providing readiness metrics for a tenant according to some embodiments.

Similarly, selecting the deployment plan section 404 may allow a user to view existing deployment plans and create a new deployment plan. For example, FIGS. 7-11 illustrate a user interface 700 generated by the software deployment tool 226 displaying a plurality of input mechanisms for receiving user input to configure a new (or existing) deployment plan. Using the user interface 700, a target device (or group of devices) associated with the tenant to update, a target software application (or group of applications) associated with the tenant to update, a target schedule for performing an update, and a target completion date. The user interface 700 may also allow a user to set a scope of an upgrade, such as by the upgrade to an operating-system-only scope, a software application-only scope, or an operating-system-and-software application scope. For example, as illustrated in FIG. 7, the user interface 700 may allow a user to specify whether a deployment plan should include operating system upgrades, software application upgrades, or a combination thereof. The user interface 700 may also allow a user to specify a version of an operating system or a software application to apply during the upgrade. Similarly, as illustrated in FIG. 8, a user can set the devices to be included in the upgrade (individually, by group, or a combination thereof). The user interface 700 may allow a user to query an inventory to locate desired devices and may display a summary of the selected devices, such as by indicating a number of devices included and a number of assets associated with such devices. In some embodiments, as illustrated in FIG. 12, the software deployment tool 226 also provides various metrics for a tenant's devices, including a readiness metric, to aid a user in selecting an appropriate number and group of devices to include in an upgrade.

Figure 9:
Figure 10:

As illustrated in FIG. 9, as part of creating a deployment plan, a user can set deployment rules. For example, a user can select to exclude particular hardware, drivers, or software applications from an upgrade through the user interface 700. For example, as illustrated in FIG. 10, applications can be included or excluded from an upgrade individually or in groups, such as based on category (business v. games) or number of installs. A user can also set validation rules for an upgrade that define how upgrades of particular devices or assets will be tested and validated. As illustrated in FIG. 11, a user can define different validation plans for assets with different importance categories (mission critical v. best effort). In some embodiments, a user can also set readiness rules that define what conditions need to be satisfied for particular device or application to be considered "ready." These rules can be applied by the software deployment tool 226 to automate portions of the plan. For example, in some embodiments, phases or stages of a deployment plan may be automatically implemented by the software deployment tool 226 when applicable rules are satisfied (unless a user overrides such automation).

Figure 13:
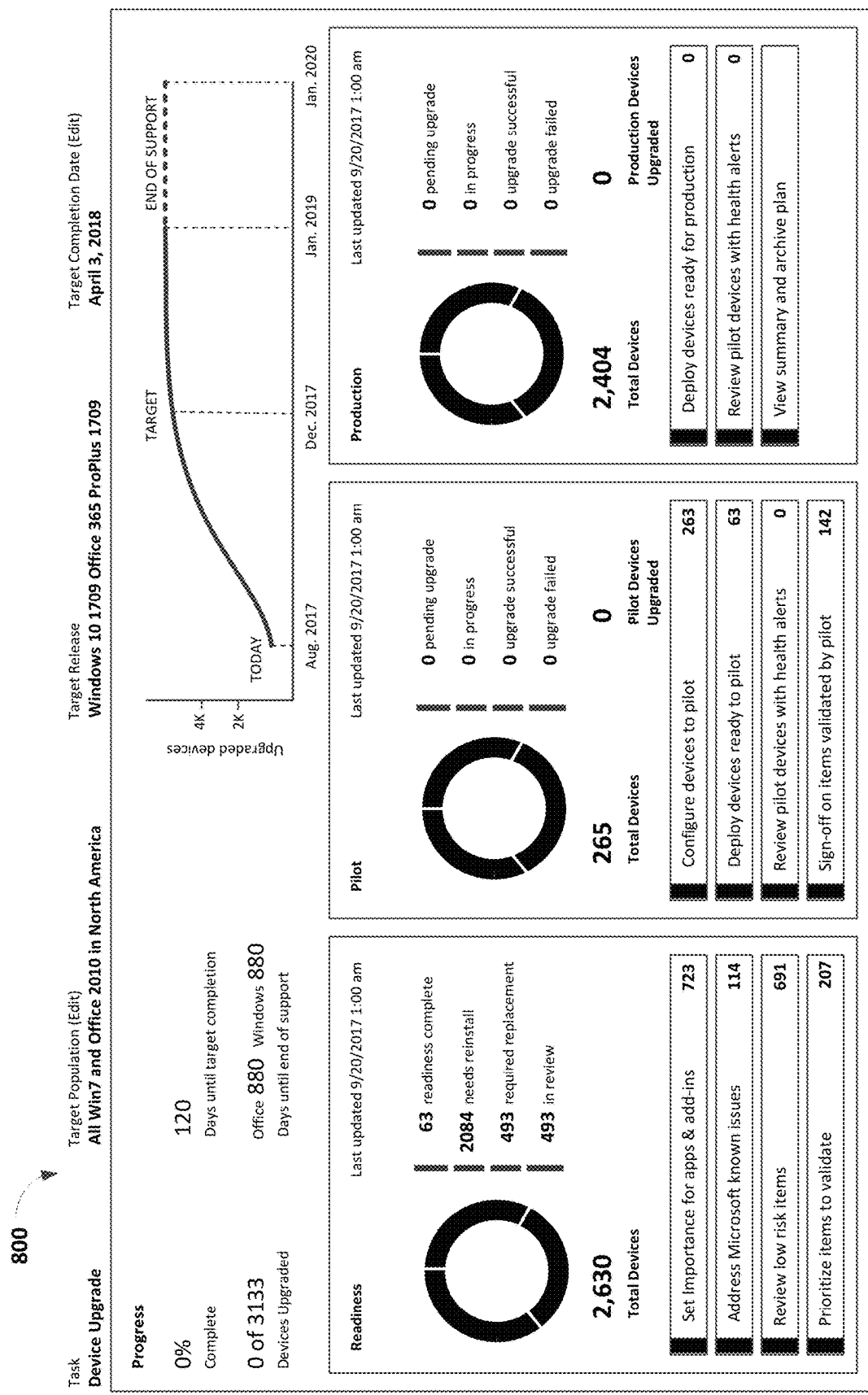
FIG. 13 illustrates a user interface generated by the software deployment tool provided via the analytics system of FIG. 1 providing a dashboard for a software deployment plan according to some embodiments.

After creating a plan, users can work on device readiness by setting the importance of various devices, applications, and add-ons, addressing known issues, reviewing low risk items and setting upgrade decisions, and working through a recommended priority list, all of which can be provided and managed through the software deployment tool 226. For example, FIG. 13 illustrates a user interface (dashboard) 800 generated by the software deployment tool 226 (updated in real time) that tracks the progress of an existing plan, including providing a readiness metric for a group of devices. A user can drill-down into a readiness metric to see information on individual devices and what actions need to be taken for each device to ready the device for the upgrade.

As illustrated in FIG. 13, the user interface 800 also provides information regarding one or more pilots for the upgrade. In some embodiments, the software deployment tool 226 generates recommendations for a pilot, including a recommended number of devices for a pilot and can indicate what percentage of distinct devices associated with the tenant are represented within a pilot. A user can modify these recommendations, including excluding certain devices from the pilot. The software deployment tool 226 can also be configured to generate other recommendations within a deployment plan, including, for example, a recommended set of devices associated with the tenant to be included in the software deployment plan, a recommended deployment schedule for the tenant, and a recommended set of applications to update as part of the software deployment. As noted above, the software deployment tool 226 may be configured to use telemetry data and machine learning techniques to develop models for generating these recommendations and, thus, can leverage data collected with respect to multiple tenants to provide more accurate recommendations. Also, in some embodiments, the software deployment tool 226 may use information regarding the availability of support for particular devices, applications, or the like and use this information to recommend a schedule or completion date for a plan to ensure that an upgrade is completed before support ends (or is limited). In some embodiments, the software deployment tool 226 is also configured to recommend security settings for one or more devices as part of an upgrade. Again, by considering the security settings of other devices (for the tenant or other tenants), the software deployment tool can learn what settings lead to successful upgrades for particular types of devices, applications, or combinations thereof.

After reviewing and configuring a pilot, a user can deploy the upgrade for the pilot devices through the software deployment tool 226 and, therefore, can use the tool 226 to monitor the deployment status of the pilot (see, for example, FIG. 13) and gain insight into failures and remediation actions. Accordingly, users can see pilot results and sign-off on items as needed through the software deployment tool 226. Users can also use the results of a pilot to modify the deployment plan (including modifying the current pilot, future pilots, and production deployment).

Subsequently, a user can deploy the plan to production, such as after a successful pilot and thereafter can monitor the deployment status (see, for example, FIG. 13) and gain insight into failures and remediation actions through the software deployment tool 226. The software deployment tool 226 can also be configured to trigger alerts for devices that have post-upgrade issues. A deployment plan can also be archived (after being signed-off by a user) and used as feedback to improve subsequent automated actions and recommendations generated by the software deployment tool 226 for the tenant or other tenants.

Thus, embodiments described herein leverage telemetry data collected across a multi-tenant environment to predict upgrade readiness for a particular tenant in a cloud system. The telemetry data may also be used to recommend deployment details to a tenant, such as upgrade schedules, pilots, devices, applications, and the like. All of this information can be provided through a user interface, such as a dashboard providing data in a real-time basis, that steps a user through the creation, management, and deployment of an upgrade. Accordingly, as compared to existing upgrade management tool, embodiments described herein provide a technical improvement by leveraging cloud system data to provide more accurate and efficient upgrade processes.

Various features and advantages of some embodiments are set forth in the following claims.

What is claimed is:

1. A method for determining a readiness of a first tenant of a cloud environment to receive an update within the cloud environment, the method comprising:
   accessing, with an electronic processor, stored telemetry data collected for each of a plurality of tenants of the cloud environment,
   determining, with the electronic processor, a first usage of the cloud environment of the first tenant,
   comparing, with the electronic processor, the first usage of the cloud environment of the first tenant to a second usage of the cloud environment of each of the plurality of tenants to identify a second tenant of the plurality of tenants, the second tenant being different than the first tenant,
   selecting, with the electronic processor, from the stored telemetry data, telemetry data collected for the second tenant, and
   providing at least the telemetry data collected for the second tenant as an input to a model,
   in response to providing at least the telemetry data collected for the second tenant to the model, receiving, from the model, with the electronic processor, a metric for the first tenant, the metric representing the readiness of the first tenant for the update; and
   displaying the metric within a user interface.

2. The method of claim 1, further comprising receiving, via the user interface, user input for configuring the update for the first tenant based on the metric.

3. The method of claim 2, wherein receiving the user input includes receiving at least one selected from a group consisting of a target device associated with the first tenant, a target software application associated with the first tenant to receive the update, a target schedule for performing the update, and a target completion date for the update.

4. The method of claim 3, wherein receiving the user input includes receiving a target scope of a software deployment plan for the update including at least one selected from a group consisting of an operating system only scope, a software application only scope, and a combined operating system and software application scope.

5. The method of claim 1, the method further comprising determining the metric based on at least the telemetry data collected for the second tenant and telemetry data collected for the first tenant.

6. The method of claim 1, wherein displaying the metric within the user interface includes displaying the metric in a dashboard updated in real-time.

7. The method of claim 1, further comprising, determining, based on the metric, a software deployment recommendation and displaying the software deployment recommendation via the user interface, the software deployment recommendation including at least one selected from a group consisting of
   a recommended set of a plurality of devices associated with the first tenant to be included in a software deployment,
   a recommended deployment schedule for the first tenant, and
   a recommended set of applications to update as part of a software deployment.

8. The method of claim 1, the method further comprising determining a security setting for at least one device associated with the first tenant, wherein the security setting is based on data collected for the second tenant.

9. The method of claim 1, wherein the stored telemetry data includes telemetry data for an operating system used by a device and at least one software application used by the device.

10. Non-transitory computer-readable medium storing instructions that, when executed by an electronic processor, perform a set of functions, the set of functions comprising:
    accessing stored telemetry data collected for each of a plurality of tenants of a cloud environment,
    determining a first usage of the cloud environment of a first tenant,
    comparing the first usage of the cloud environment of the first tenant to a second usage of the cloud environment of each of the plurality of tenants to identify a second tenant of the plurality of tenants, the second tenant being different than the first tenant, selecting, from the stored telemetry data, telemetry data collected for the second tenant, and providing at least the telemetry data collected for the second tenant as an input to a model, in response to providing at least the telemetry data collected for the second tenant to the model, receiving, from the model, a metric for the tenant, the metric representing a readiness of the tenant for an update within the cloud environment; and displaying the metric within a user interface.

11. The computer-readable medium of claim 10, wherein the set of functions further comprising determining, based on the metric a software deployment recommendation and displaying the software deployment recommendation via the user interface, the software deployment recommendation including at least one selected from a group consisting of a recommended set of a plurality of devices associated with the first tenant to be included in a software deployment, a recommended deployment schedule for the first tenant, and a recommended set of applications to update as part of a software deployment.

12. The computer-readable medium of claim 11, the set of functions further comprising receiving, via the user interface, user input for configuring the update for the first tenant based on the metric.

13. The computer-readable medium of claim 12, wherein receiving the user input includes receiving a target scope of a software deployment plan for the update including at least one selected from a group consisting of an operating system only scope, a software application only scope, and a combined operating system and software application scope.

14. The computer-readable medium of claim 11, wherein determining the software deployment recommendation further includes determining a security setting for at least one device associated with the first tenant, wherein the security setting is based on the telemetry data collected for the second tenant.

15. The computer-readable medium of claim 11, wherein the stored telemetry data includes telemetry data for an operating system used by a device and at least one software application used by the device.

16. A system for determining a readiness of a first tenant of a cloud environment to receive an update within the cloud environment, the system comprising:

at least one electronic processor configured to access stored telemetry data collected for each of a plurality of tenants of the cloud environment, determine a first usage of the cloud environment of the first tenant, compare the first usage of the cloud environment of the first tenant to a second usage of the cloud environment of each of the plurality of tenants to identify a second tenant of the plurality of tenants, the second tenant being different than the first tenant, select, from the stored telemetry data, telemetry data collected for the second tenant, and provide at least the telemetry data collected for the second tenant as an input to a model, in response to providing at least the telemetry data collected for the second tenant to the model, receive, from the model, a metric for the first tenant, the metric representing the readiness of the first tenant for the update, and display the metric within a user interface.

17. The system of claim 16, wherein the electronic processor is configured to determine the metric based on at least the telemetry data collected for the second tenant and telemetry data collected for the first tenant.

* * * * *